Sept. 10, 1929.  J. P. BIETSCH  1,727,806
IDENTIFICATION TAG
Filed Aug. 25, 1927
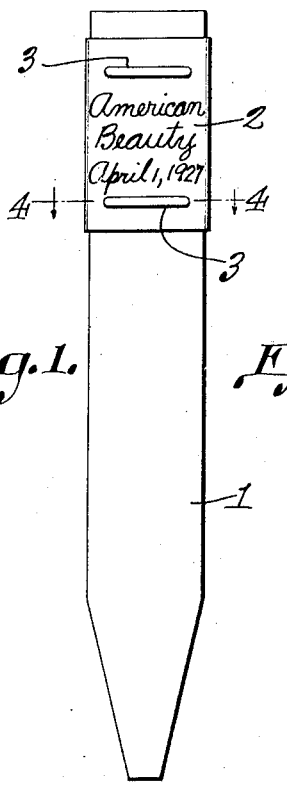
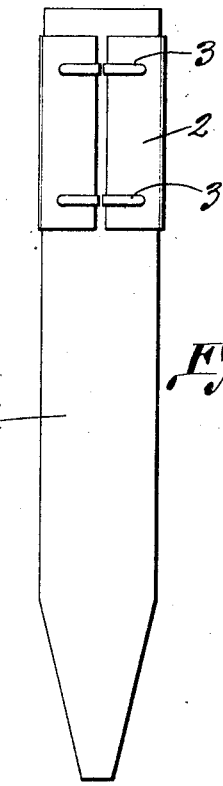
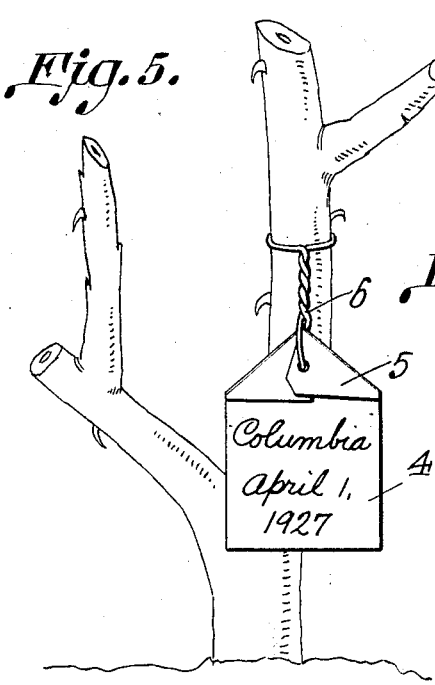
John P. Bietsch Inventor
By C. A. Snow & Co.
Attorney Patented Sept. 10, 1929.

1,727,806

UNITED STATES PATENT OFFICE.

JOHN P. BIETSCH, OF CHAMBERSBURG, PENNSYLVANIA.

IDENTIFICATION TAG.

Application filed August 25, 1927. Serial No. 215,398.

This invention relates to an identification tag designed primarily for use as a means for identifying plants over a long period of time. Heretofore tags of different kinds have been employed for this purpose. Most of them are small wooden tags attached to the plants by wires. On these tags have been printed or otherwise displayed the names and other data pertaining to the plants with which the tags are associated. The action of the weather, spraying preparations and the like soon render the data illegible and the desired information becomes lost.

It is an object of the present invention to provide an identifying tag in which a permanent record can be impressed readily without requiring the use of any special tools or implements, the construction of the tag being such that it will withstand climatic changes and any preparations that may be used for spraying or otherwise treating the plants.

A further object is to provide a device of this character which is cheap to manufacture and can be applied in the usual way to the plants.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred forms of the invention have been shown.

In said drawings,

Figure 1 is an elevation of an identifying tag in the form of a stake having the present improvements combined therewith.

Figure 2 is an edge view thereof.

Figure 3 is a rear elevation.

Figure 4 is a section on line 4—4, Figure 1.

Figure 5 is an elevation of a modified form of tag connected to a plant a portion of which is shown.

Figure 6 is an edge view of the tag shown in Figure 5.

Referring to the figures by characters of reference 1 designates a thin stake preferably of soft wood although it can be of any other desired material, one end of the stake being pointed as shown so that it can be forced readily into the soil. Stakes of this kind have heretofore been used for identifying plants but the identification data has been printed or otherwise displayed directly on the stake. The present stake is provided, adjacent one end with a covering 2 formed of thin ductile metal which can be held to the stake in any manner desired. For example, staples 3 can be forced through the sheet of metal and clinched at the back of the stake as shown. When it is desired to place identification data on the tag it is merely necessary to use a stylus, pin or the like as a pencil, pressing firmly against the surface of the soft metal piece 2 so as to make an impression therein. The name of the plant, the date of planting and any other data desired can thus be written on the plate and will make a permanent impression which will not leave the plate under any weather conditions or under the action of any sprays or the like that might be used on the plants. The soft wood backing yields readily under the pressure of the stylus or other device used in entering the data on the stake.

Instead of utilizing a stake as shown in Figures 1, 2 and 3, a tag 4 can be employed, this having corner portions folded over as at 5 with a wire 6 inserted through the corner portions where they lap. This wire can be employed for attaching the tag to the plant. The entire tag 4 is formed of a metal similar to the plate 2, namely a metal which will readily receive an impression made with a stylus. Consequently by placing this tag on a soft surface such as wood or the like and pressing a stylus against the tag while writing thereon, the impression will be made permanent and the plant can be identified at all times. The materials used in the formation of the tag 4 and the plate 2 can be of any metals meeting the requirements. In practice pure tin in thin sheet form has been found very suitable.

What is claimed is:

An identification tag including a stake of soft wood having a flat surface, a covering on one end portion of the stake formed of thin ductile metal, and means for attaching said covering to the stake, said covering and that portion of the stake covered thereby being adapted to be depressed by a stylus used in making an impression in the covering.

In testimony that I claim the foregoing as my own, I have hereto affixed my signature.

JOHN P. BIETSCH.